Nov. 30, 1943.  H. J. WILLIAMS  2,335,832
FLUID COUPLING
Filed March 2, 1942
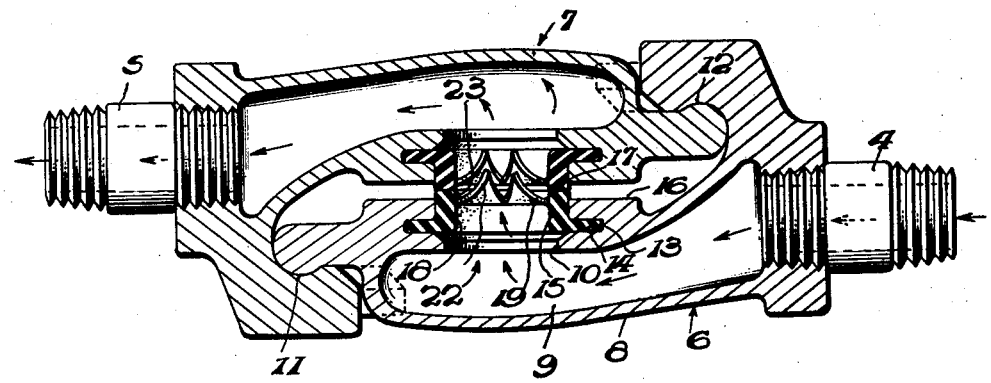
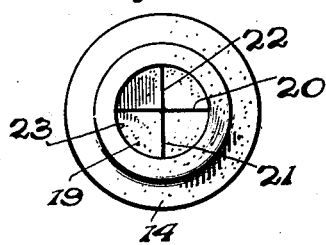
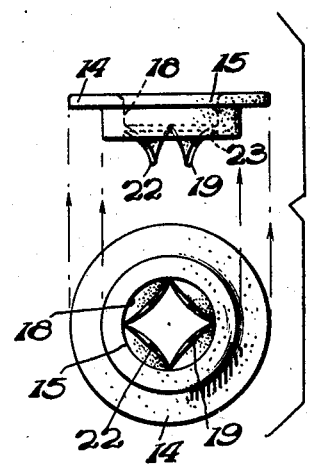
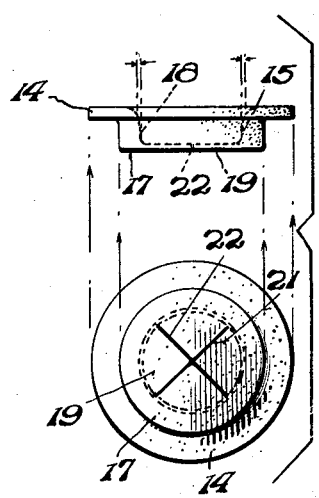
Inventor
Herbert J. Williams.
By N. D. Parker Jr.
Attorney Patented Nov. 30, 1943

2,335,832

UNITED STATES PATENT OFFICE 2,335,832

FLUID COUPLING

Herbert J. Williams, Elyria, Ohio, assignor to Bendix-Westinghouse Automotive Air Brake Company, Elyria, Ohio, a corporation of Delaware Application March 2, 1942, Serial No. 433,053

2 Claims. (Cl. 284—8)

This invention relates to braking systems for tractor-trailer vehicle trains, and more particularly to means for coupling the brake system of one vehicle to that of the other. It has been customary in connection with fluid pressure brake systems installed on tractor-trailer trains to connect the supply of fluid pressure from one vehicle to the other by means of a flexible hose, connected to at least one of the vehicles by means of a readily detachable coupling so that, on uncoupling of the vehicles, the operator could at the same time uncouple the hose line. In view of the fact that such hose couplings of the detachable type necessarily have an outlet port, it frequently happened that, after the vehicles were uncoupled, dirt or other foreign substance entered the outlet port of the hose coupling and was, on subsequent recoupling of the vehicles, carried through the lines of the trailer by the flow of fluid pressure from the tractor brake system with resultant damage to the control valve mechanism on the trailer.

It is accordingly an object of the present invention to provide novel means for coupling the fluid pressure control line of the tractor-trailer vehicle so constituted as to prevent the entrance of dirt or other foreign substance into the interior of the coupling during the time it is disconnected.

Another object of the invention is to provide closure means for such couplings so arranged as to be automatically operable to permit establishment of a fluid pressure connection between the coupling members when the members are coupled together.

Yet another object of the invention is to provide a detachable coupling device for fluid pressure lines having means for preventing the entrance of dirt to the coupling members when uncoupled and for permitting the passage of fluid pressure when coupled, this means being actuated automatically by the action of fluid pressure thereon.

A further object of the invention is to provide novel and efficient hose coupling means so constituted as to prevent the entrance of dirt in the interior of the coupling when the coupling is disconnected without preventing the escape of fluid pressure from the coupling in the event of accidental disconnection of the coupling.

Still another object of the invention is to provide dirt excluder means for detachable hose couplings in a fluid pressure brake system so constituted as to permit the proper operation of the braking system with the couplings either connected or disconnected.

A still further object of the invention is to provide mechanism of the above character so constituted as not to require the use of additional parts in connection with the couplings for the purpose of accomplishing the desirable ends above set forth.

These and other novel features of the invention will be more fully understood from the following detailed description when taken in connection with the accompanying drawing. It is to be expressly understood, however, that the drawing is utilized for purposes of illustration only and is not to be taken as a definition of the limits of the invention, reference being had for such purpose to the appended claims.

Referring to the drawing, wherein similar reference characters refer to like parts throughout the several views:

Fig. 1 is a sectional view of a pair of coupling members embodying one form of the present invention;

Fig. 2 is a plan view of the sealing gasket employed in the coupling members illustrated in Fig. 1;

Fig. 3 shows side and plan views of the position assumed by the gaskets under certain operating conditions, and Fig. 4 shows side and plan views of a modified form of the gasket adapted for use with the above type of coupling.

Referring particularly to Fig. 1 of the drawing, a pair of fluid pressure control lines 4 and 5 are adapted to be connected by means of a pair of complementary coupling members 6 and 7, each coupling member preferably being of identical construction and interchangeable in all respects. One only of the coupling members will accordingly be described in detail, the coupling member 6, for example, having a casing 8 provided with an inlet chamber 9 connected with the conduit 4 and a suitable outlet port 10 formed in the wall of the chamber. The member is provided with a cam surface 11 and an oppositely disposed cam surface 12, these cam surfaces being adapted to engage the corresponding surfaces formed on the complementary coupling member adapted to be connected therewith, and the action of these cam surfaces being such that, on relative rotative movement of the coupling members around the center line of the port 10, the coupling members will be interlocked and moved toward each other in an axial direction relative to the outlet port.

The outlet port 10 is provided with a groove 13 adapted to receive an annular flange 14 forming a portion of a resilient sealing gasket 15, the flange serving to locate the gasket in a position concentric with the outlet port 10 of the coupling member. The gasket is so formed as to project above a surface 16 formed on the coupling member, a face 17 formed on the gasket being adapted to sealingly engage the corresponding face of a gasket positioned in the complementary coupling member, and a port 18 being formed in the gasket for the purpose of permitting passage of fluid pressure therethrough from the inlet chamber 9.

Since it is desirable that the port 18 be closed to prevent the entrance of dirt into the chamber 9 when the coupling is in disengaged position, a relatively thin web 19 is formed as an integral part of the gasket material and normally serves to close the port 18 against the entrance of dirt or other foreign substance. This normally flat web is preferably provided with slots or slits 20 and 21, as more particularly illustrated in Fig. 2, these slots serving to divide the web into a plurality of resilient segments 22, which, under the action of fluid pressure in the inlet chamber 9 of the coupling member, are forced outwardly, as shown in Fig. 1, in order to permit the flow of fluid pressure through the port 18 of the gasket 15 from the inlet chamber of the coupling member. In the form of the invention illustrated in Figs. 1 and 2, the web is preferably located in such a manner as to provide a shallow recess 23 between the outer face of the web and the surface 17 of the gasket, the result being that, when two similarly equipped coupling members are in connected position, the recess 23 and the corresponding recess in the gasket of the other coupling members provide a spacing between the resilient segments of the web sufficient to allow deflection of the segments under the action of fluid pressure without interference occurring due to contact of the segments of the complementary gaskets in this position. The recess thus formed, however, is so shallow as to minimize any tendency for dirt to collect in the recess, when the coupling members are in disconnected position, which would tend to pass into the interior of the coupling on subsequent connection thereof, with consequent damage to any apparatus which might be supplied with fluid pressure through the coupling. It will also be apparent that the segments so formed in the web are equally adapted for motion in either direction from their normal neutral position, thus permitting a relatively unrestricted flow of fluid through the port 18 in either direction as the case may be.

While it will be understood that dirt in a dry state will have little tendency to collect in the recess 23 illustrated in Fig. 1, it is possible that, when operating conditions are encountered such that mud would tend to collect in the recess, it may be more desirable to form the web 19 in such a position that its outer surface is substantially flush with the outer surface 17 of the gasket, and such a construction is illustrated in Fig. 4. In this embodiment of the invention, a flange 14 is adapted to engage the slot provided therefor in the coupling member and a port 18 is centrally located in the gasket, this port being closed at the outer end of the gasket by means of a web 19 having its outer surface flush with the outer face of the gasket 17, slots or slits 21 and 22 serving again to divide the web into a plurality of segments adapted on the application of fluid pressure thereto to deflect sufficiently to permit a relatively unrestricted passage of fluid pressure through the port 18 in the gasket. Although it will be understood that the outer surfaces of the segments will be in contact when the couplings are in engaged position, it has been found that the thickness of the web can be so chosen as to provide sufficient resiliency in the segments to permit a comparatively unrestricted flow of fluid pressure between two coupling members when this type of gasket is used. Any dirt or mud which may collect on the outer face of the gasket or web may be readily removed by the operator prior to the coupling operation, with the result that the entrance of such material into the interior of the couplings is almost entirely prevented.

It will be seen from the foregoing description that a coupling device constructed as illustrated and described will effectively prevent the entrance of dirt and other foreign substance into the vital parts of the braking system, and furthermore that this desirable end is obtained by the use of a single suitably formed element taking the place of the ported gasket previously commonly used in connection with such coupling members to effect sealing engagement therebetween, this novel and efficient arrangement not only being available for use with existing couplings but also for similar couplings which may be produced in the future, without necessitating expensive changes in equipment already in service.

While two embodiments of the invention have been illustrated and described with considerable particularity, it is to be expressly understood that the invention is in no way limited thereby and that various changes and modifications may be made therein without departing from the scope of the invention, for the limits of which reference will be had to the appended claims.

What is claimed is:

1. Coupling means for a vehicle-carried fluid pressure braking system of the type including a fluid pressure control line on each vehicle, comprising a detachable ported coupling member associated with each control line, resilient sealing means associated with the port of each member having an outer sealing surface adapted on coupling of said members to engage a corresponding surface and to permit the passage of fluid pressure from one member to the other, and a resilient slotted web formed in said sealing means for normally closing said ports when the coupling members are disconnected, the outer surface of said web being in the plane of the first named surface for facilitating the removal of foreign substances therefrom.

2. A sealing gasket for a fluid pressure coupling member having an outer surface adapted for sealing engagement with a corresponding gasket in a second coupling member and including a port therethrough and a slotted resilient weblike portion for normally closing said port, the resulting segmental portions of said web being deflectable in response to the action of fluid pressure thereon to permit a substantially unrestricted passage of fluid pressure through the port of said gasket and the outer surface of the web being located in the plane of the first named surface for facilitating the removal of foreign substances therefrom.

HERBERT J. WILLIAMS.